United States Patent
Ge

(10) Patent No.: US 10,807,002 B2
(45) Date of Patent: Oct. 20, 2020

(54) VISUAL METHOD AND APPARATUS FOR COMPENSATING SOUND INFORMATION, STORAGE MEDIUM AND ELECTRONIC DEVICE

(71) Applicant: NETEASE (HANGZHOU) NETWORK CO., LTD., Hangzhou (CN)

(72) Inventor: Jin Ge, Hangzhou (CN)

(73) Assignee: NETEASE (HANGZHOU) NETWORK CO., LTD., Hangzhou, Zhejiang (CN)

( * ) Notice: Subject to any disclaimer, the term of this patent is extended or adjusted under 35 U.S.C. 154(b) by 134 days.

(21) Appl. No.: 16/109,749

(22) Filed: Aug. 23, 2018

(65) Prior Publication Data
US 2019/0060758 A1    Feb. 28, 2019

(30) Foreign Application Priority Data
Aug. 30, 2017    (CN) .......................... 2017 1 0762298

(51) Int. Cl.
*A63F 13/5375* (2014.01)
*G06F 3/0488* (2013.01)
(Continued)

(52) U.S. Cl.
CPC ........ *A63F 13/5375* (2014.09); *A63F 13/533* (2014.09); *G06F 3/0488* (2013.01);
(Continued)

(58) Field of Classification Search
None
See application file for complete search history.

(56) References Cited

U.S. PATENT DOCUMENTS 8,841,535 B2 * 9/2014 Collins ............... G06F 3/04817
715/727
2003/0109305 A1    6/2003 Gavin et al.
(Continued)

FOREIGN PATENT DOCUMENTS

CN        105879390 A     8/2016
CN        106102848 A     11/2016
(Continued)

OTHER PUBLICATIONS

To discover the enemy soldier by 'sound indicator' which makes sound visualized.
(Continued)

*Primary Examiner* — James S. McClellan
*Assistant Examiner* — Peter J Iannuzzi
(74) *Attorney, Agent, or Firm* — Yunling Ren

(57) ABSTRACT

The present disclosure provides a visual method and apparatus for compensating sound information, a storage medium, and an electronic device, and relates to the field of human-computer interaction technologies. The method includes: detecting a sound in a first preset range of the game scene, and acquiring a type of the sound, and an orientation of the sound source of the sound relative to the virtual object; providing a visual control on the graphical user interface, the visual control including a virtual component associated with the type of the sound; and controlling a pointing direction of the virtual component according to the orientation of the sound source of the sound relative to the virtual object.

23 Claims, 11 Drawing Sheets

(51) Int. Cl.
*A63F 13/533* (2014.01)
*G06F 3/16* (2006.01)
*A63F 13/215* (2014.01)
*A63F 13/54* (2014.01)

(52) U.S. Cl.
CPC ............... *G06F 3/16* (2013.01); *G06F 3/165* (2013.01); *A63F 13/215* (2014.09); *A63F 13/54* (2014.09); *A63F 2300/305* (2013.01)

(56) References Cited

U.S. PATENT DOCUMENTS

| | | | | |
|---|---|---|---|---|
| 2003/0216177 | A1* | 11/2003 | Aonuma | A63F 13/10 463/32 |
| 2007/0218966 | A1* | 9/2007 | Tilston | A63F 13/10 463/5 |
| 2014/0066197 | A1* | 3/2014 | Cousins | A63F 13/06 463/31 |

FOREIGN PATENT DOCUMENTS

| | | |
|---|---|---|
| CN | 106693338 A | 5/2017 |
| JP | 2005505357 A | 2/2005 |
| JP | 2015228054 A | 12/2015 |
| JP | 2017055935 A | 3/2017 |
| WO | 2017047078 A1 | 3/2017 |

OTHER PUBLICATIONS

[COMPUTEX] Detailed report on the "ROG" press conference that attracts attention products such as Mini-ITX models of motherboards for gamers and liquid-cooled + air-cooled GPUs.
The JP1OA dated Aug. 20, 2019 by the JPO.
The CN1OA No. 2017110917415 issued by CNIPA dated Aug. 15, 2018.
The CN1OA No. 2017107622983 issued by CNIPA dated Feb. 23, 2018.

* cited by examiner

VISUAL METHOD AND APPARATUS FOR COMPENSATING SOUND INFORMATION, STORAGE MEDIUM AND ELECTRONIC DEVICE

CROSS REFERENCE

This application is based upon and claims priority to Chinese Patent Application No. 201710762298.3, filed on Aug. 30, 2017, the entire contents thereof are incorporated herein by reference.

TECHNICAL FIELD

The present disclosure relates to the field of human-computer interaction technologies, and more particularly, to a visual method and apparatus for compensating sound information, a storage medium, and an electronic device.

BACKGROUND

In a game of conventional terminals (such as PC, or console device), a user may control a virtual object the game scene and make different kinds of game operation under various environment then the user has to acquire an environment information based on the current position of the virtual object, such as the type and the location of a sound in a certain area of the game scene. For example, a location of an enemy character in the game may be determined by sound variation of footsteps, and for another example, a danger signal may be triggered by gunshots from the other virtual characters (such as enemy characters, or ally characters) in the game. Therefore, in a conventional PC game, which is generally placed at home or a relatively quiet space, the user can quickly determine the environment in which the virtual object is located according to the sound in the game, and make a fast response. In addition, the immersion is not easily interrupted due to the application occasion of the conventional terminal, especially with a good earphone or sound equipment, which will bring a better gaming experience to the user.

At present, with the popularization of mobile terminals, games are increasingly developed on the mobile terminals. However, compared with a conventional terminal, application occasions of the game on the mobile terminal are relatively wider with the characterization of portability. When the mobile terminal is applied in a noisy occasion, it is difficult for the user to determine the environment in which the virtual object controlled by the user is located through the sound in the game, and the immersion of game is easily interrupted.

It should be noted that the information disclosed in the above background section is only for enhancement of understanding of the background of the present disclosure and therefore can include other information that does not form the prior art that is already known to those of ordinary skills in the art.

SUMMARY

The present disclosure aims at providing a visual method and apparatus for compensating sound information, a storage medium, and an electronic device.

According to an aspect of the present disclosure, there is provided a visual method for compensating sound information, applied to a touch terminal capable of presenting a graphical user interface, the graphical user interface at least partially including a game scene, and at least part of a virtual object, wherein the method includes:

detecting a sound in a first preset range of the game scene, and acquiring a type of the sound, and an orientation of the sound source of the sound relative to the virtual object;

providing a visual control on the graphical user interface, the visual control including a virtual component associated with the type of the sound; and controlling a pointing direction of the virtual component according to the orientation of the sound source of the sound relative to the virtual object.

According to an aspect of the present disclosure, there is provided a visual method for compensating sound information, applied to a touch terminal capable of presenting a graphical user interface, the graphical user interface at least partially including a game scene, and at least part of a virtual object, wherein the method includes:

detecting a plurality of sounds in a first preset range of the game scene, and acquiring a type of each of the sounds, and an orientation of the sound source of each of the sounds relative to the virtual object;

providing a visual control on the graphical user interface, the visual control including a virtual component associated with a type of a first sound in the plurality of sounds; and controlling a pointing direction of the virtual component according to the orientation of the sound source of the first sound relative to the virtual object.

According to an aspect of the present disclosure, there is provided a visual method for compensating sound information, applied to a touch terminal capable of presenting a graphical user interface, the graphical user interface at least partially including a game scene, and at least part of a virtual object, wherein the method includes:

detecting a plurality of sounds in a first preset range of the game scene, and acquiring a type of each sound, and an orientation of the sound source of each of the sounds relative to the virtual object;

providing a plurality of visual controls on the graphical user interface, the number of the visual controls being the same as the sounds, wherein the plurality of visual controls are provided in one-to-one correspondence with the plurality of sounds, and each of the visual controls includes a virtual component associated with the type of a respective one of the sounds;

controlling a pointing direction of each of the virtual components according to the orientation of the sound source of a respective one of the sounds relative to the virtual object.

According to an aspect of the present disclosure, there is provided a computer readable storage medium storing a computer program thereon, wherein the computer program is executed by a processor to implement any of the above-mentioned visual methods for compensating sound information.

According to an aspect of the present disclosure, there is provided an electronic device, including:

a processor; and a memory for storing executable instructions of the processor;

wherein the processor is configured to execute any one of the forgoing visual method for compensating sound, information via executing the executable instructions.

It should be understood that the foregoing general description and the following detailed description are exemplary and explanatory only, and cannot limit the present disclosure.

BRIEF DESCRIPTION OF THE DRAWINGS

By describing the exemplary embodiments in detail with reference to the drawings, the above and other features and advantages of the disclosure will become more apparent. Obviously, the drawings in the following description merely relate to some embodiments of the disclosure, and based on these drawings, those of ordinary skills in the art may obtain other drawings without going through any creative effort. In the drawings.

DETAILED DESCRIPTION

At present, some game developers indicate an orientation of a sound source of the sound in the game relative to the virtual object by displaying an arrow on a graphical user interface, or a volume variation of the sound by displaying a control including a sound waveform on the graphical user interface.

None of the above manners could simultaneously display all of the followings on the graphical user interface the type of the sound, the distance between the sound and the virtual object or the orientation of the sound relative to the virtual object on the interface. Accordingly, the user cannot acquire the type of the sound, the distance between the sound and the virtual object or the orientation of the sound relative to the virtual object simultaneously in the noisy environment, so that the user experience of the game is poor.

The example embodiments will be now described more comprehensively with reference to the drawings.

Figure 1:
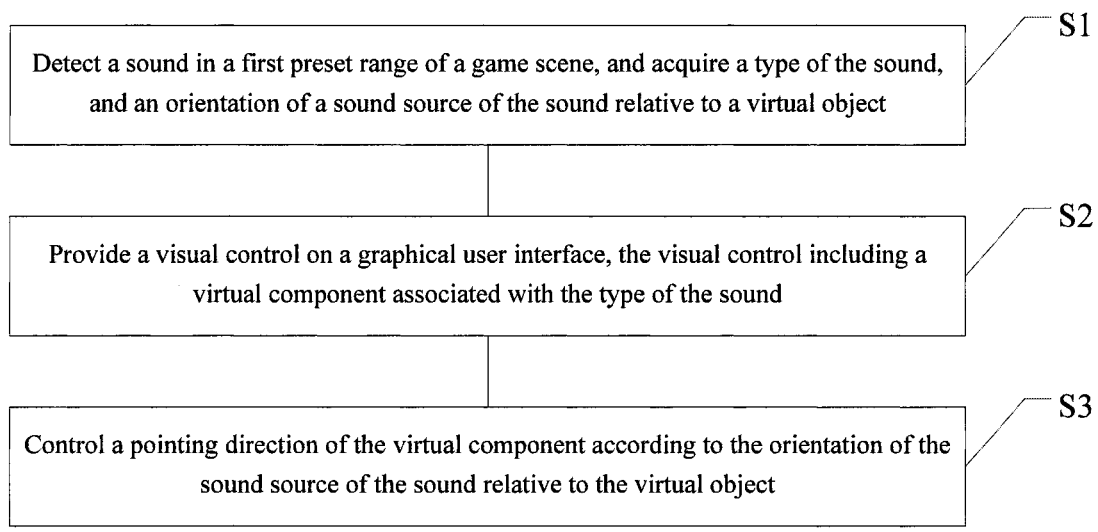
FIG. 1 is a first flow chart of a visual method for compensating sound information according to the present disclosure.

First, the exemplary embodiments disclose a visual method for compensating sound information, applied to a touch terminal capable of presenting a graphical user interface, the graphical user interface at least partially including a game scene, and at least part of a virtual object. The touch terminal may be, for example, an electronic device having a touch screen such as a mobile phone, a tablet computer, a laptop computer, a game machine, or a PDA. A game application may be executed on the touch terminal, through an application program interface of the touch terminal, a graphical user interface (GUI) is rendered on the touch screen, so as to display a virtual object and a virtual joystick area including a virtual joystick, a virtual battle scene, a virtual natural environment, etc. The GUI may either be occupied an entire area of the touch screen or just a partial area, which is not specifically limited in the exemplary embodiments. The virtual object refers to a game character controlled by the user, and is displayed on the GUI with a partial or overall form of the game character. For example, in a first person perspective, the content of GUI is displayed by a master perspective of the user, which enhances the immersive experience of the user, and only a part of the game character, such as a hand or a foot, may be shown on the GUI; while in a third-person perspective, the game character may be presented in the GUI as a whole, which reduces the difficulty of game manipulation and dizziness of the user, and emphasizes the sense of movement in the game. The developer may determine the specific display manner according to the game contents, which will not be limited in the present disclosure. As shown in FIG. 1, the visual method for compensating sound information may include the following steps.

In step S1, a sound in a first preset range of the game scene is detected, and type of the sound and an orientation of a sound source of the sound relative to the virtual object are acquired.

In step S2, a visual control is provided on the graphical user interface, the visual control including a virtual component associated with the type of the sound.

In step S3, a pointing direction of the virtual component is controlled according to the orientation of the sound source of the sound relative to the virtual object.

According to the visual method for compensating sound information in the exemplary embodiments, on one hand, a method of simultaneously displaying the type of the sound and the orientation of the sound source of the sound relative to the virtual object is provided by the virtual component associated with the type of the sound, the display form of the virtual component, and the pointing direction of the virtual component, such that the user can identify the type of the sound, and the orientation of the sound source of the sound relative to the virtual object in a noisy environment by means of the virtual component associated with the type of the sound, the display form of the virtual component, and the pointing direction of the virtual component, on the other hand, since the user can simultaneously recognize the type of the sound and the orientation of the sound source of the sound relative to the virtual object through the above manner, the user experience is better than that of the related art.

Hereinafter, the visual display method for compensating sound information in the exemplary embodiment will be further described with reference to FIG. 1.

In step S1, the sound in the first preset range of the game scene is detected, and the type of the sound and the orientation of the sound source of the sound relative to the virtual object are acquired.

In the present exemplary embodiment, the size of the first preset range may be set by a developer according to game contents. For instance, the first preset range may be a range determined according to an auditory range of a virtual object, and may also be an entire area of the game scene, or an area of the game scene currently displayed on the GUI.

The sound in the first preset range may be detected by a detection module at a preset period, and the preset period may be set by the developer. However, in order to ensure the accuracy of sound detection, it is unallowable to set the preset period to be too long.

The type of the sound may be acquired by a sound type acquisition module. The type of the sound may be the sound of a footstep, a conversation, a door opening, a gunshot, and a fighting, etc., which is not specifically limited in the present exemplary embodiment.

Coordinates of the virtual object and coordinates of the sound source of the sound may be acquired, and the orientation of the sound source of the sound relative to the virtual object may be calculated according to the coordinates of the virtual object and the coordinates of the sound source of the sound.

In step S2, a visual control is provided on the graphical user interface, the visual control including the virtual component associated with the type of the sound.

In the present exemplary embodiment, the visual control may be arranged at any position on the GUI. For example, the visual control may be arranged at an upper left of the GUI; and for another example, the visual control may be arranged at a lower right of the GUI, which is not specifically limited in the present exemplary embodiment. A shape of the visual control may be a circle, a square, an ellipse, or the like. A color of the visual control may be set as green, dark, grey, or the like.

The virtual component may include an ideographic image and a direction identifier. The ideographic image is used to display the type of the sound, therefore, the ideographic image is consistent with the type of the sound. To make the user quickly recognize the type of the sound based on the ideographic image, the ideographic image may be corresponding to the type of the sound. For example, when there is a footstep in such game scene, the ideographic image may be shown as a shape of feet or an icon of a costumed shoe. For another example, when the type of the sound is a gunshot, the ideographic image may be shown as a shape of a gun or a bullet. A color of the ideographic image may be set by the developer, and may also be distinguished according to various types of the sounds. For example, when the type of the sound is a gunshot, the color of the ideographic image may be set according to a color of the gun. For another example, when the type of the sound is a footstep, the color of the ideographic image may be set as black. It should be noted that the color of the ideographic image and the color of the visual control cannot be set to be too close to each other; otherwise the user cannot quickly recognize the ideographic image.

The direction identifier is used to indicate an orientation of the sound source of the sound relative to the virtual object, and therefore, a pointing direction of the direction identifier is consistent with the orientation of the sound source of the sound relative to the virtual object. The direction identifier may be an arrow or a triangle, and may also be an identifier having a pointing direction, such as a pointer, which is not specifically limited in this exemplary embodiment. A color of the direction identifier may be set by the developer, for example, may be green, or red. The pointing direction of the direction identifier may be changed continuously in 360 degree following the change of orientation of the sound source of the sound relative to the virtual object, i.e., when the sound source of the sound changes continuously relative to the orientation of the virtual object, the pointing direction of the direction identifier is also changed continuously.

In step S3, the pointing direction of the virtual component is controlled according to the orientation of the sound source of the sound relative to the virtual object.

In the present exemplary embodiment, when the virtual component includes the ideographic image and the direction identifier, the pointing direction of the direction identifier in the virtual component may be controlled according to the orientation of the sound source of the sound relative to the virtual object.

In the present exemplary embodiment, the direction identifier may be arranged at any fixed position surrounding the visual control. Based on this, the direction identifier may be rotated as a center of any point on the direction identifier to change the pointing direction of the direction indicator.

In the present exemplary embodiment, the direction identifier may also be arranged on a boundary of the visual control or arranged around the visual control. Based on this, the direction identifier may be moved along a preset track to change the pointing direction of the direction identifier, wherein the preset track may be, for example, the boundary of the visual control.

In an embodiment, the visual method for compensating sound information may further include: acquiring a distance between the sound source of the sound and the virtual object; and controlling a display form of the virtual component according to the distance between the sound source of the sound and the virtual object.

In an embodiment, the controlling the display form of the virtual component according to the distance between the sound source of the sound and the virtual object may include: controlling a display form of at least one of a transparency, a size, and a brightness of the virtual component according to the distance between the sound source of the sound and the virtual object.

In the present exemplary embodiment the controlling the display form of the virtual component according to the distance between die sound source of the sound and the virtual object may include following manners.

In a first manner, a display form, such as a transparency of the virtual components is controlled according to the distance between the sound source of the sound and the virtual object.

In the present exemplary embodiment, the transparency of the virtual component is inversely related to the distance between the sound source of the sound and the virtual object, i.e., the further the distance between the sound source of the sound and the virtual object is, the higher the transparency of the virtual component is; and the closer the distance between the sound source of the sound and the virtual object is, the lower the transparency of the virtual component is. It should be noted that the transparency of the virtual component is in the range from 100% to 0%, wherein the virtual component is completely transparent when the transparency of the virtual component is 100%, and the virtual component is completely opaque when the transparency of the virtual component is 0%.

In a second manner, a display form, such as a size of the virtual component is controlled according to the distance between the sound source of the sound and the virtual object.

In the present exemplary embodiment, the size of the virtual component is inversely related to the distance between the sound source of the sound and the virtual object. In other words, the further the distance between the sound source of the sound and the virtual object is, the smaller the size of the virtual component is; and the closer the distance between the sound source of the sound and the virtual object is, the larger the size of the virtual component is.

In a third manner, a display form, such as a brightness of the virtual component is controlled according to the distance between the sound source of the sound and the virtual object.

In the present exemplary embodiment, the brightness of the virtual component is inversely related to the distance between the sound source of the sound and the virtual object, i.e., the further the distance between the sound source of the sound and the virtual object is, the lower the brightness of virtual component is; and the closer die distance between the sound source of the sound and the virtual object is, the higher the brightness of the virtual component is.

It should be noted that the display forms of at least two or three of the transparency, the size and the brightness of the virtual component may also be controlled according to the distance between the sound source of the sound and the virtual object.

Moreover, when the virtual component includes the ideographic image and the direction identifier, the controlling the display form of the virtual component according to the distance between the sound source of the sound and the virtual object includes: controlling a display form of the ideographic image and/or the direction Identifier in the virtual component according to the distance between the sound source of the sound and the virtual object.

In the present exemplary embodiment, the distance between the sound source of the sound and the virtual object may be displayed by simultaneously controlling the display forms of the ideographic image and the direction identifier, or the distance between the sound source of the sound and the virtual object may be displayed by controlling the display form of one of the ideographic image and the direction identifier.

Further, a display form of a transparency of the ideographic image and/or the direction identifier in the virtual component may be controlled according to the distance between the sound source of the sound and the virtual object; or a display form of a size of the ideographic image and/or the direction identifier in the virtual component may be controlled according to the distance between the sound source of the sound and the virtual object; or a display form of a brightness of the ideographic image and/or the direction identifier in the virtual component may be controlled according to the distance between the sound source of the sound and the virtual object.

It should be noted that, any two or three display forms among the transparency, the size, or the brightness of the ideographic image and/or the direction identifier in the virtual component may also be controlled according to the distance between the sound source of the sound and the virtual object.

In conclusion, a method of simultaneously displaying the type of the sound, and the orientation of the sound source of the sound relative to the virtual object is provided by the virtual component associated with the type of the sound, the display form of the virtual component, and the pointing direction of the virtual component, such that the user can identity the type of the sound, and the orientation of the sound source of the sound relative to the virtual object in a noisy environment by means of the virtual component associated with the type of the sound, the display form of the virtual component, and the pointing direction of the virtual component. Moreover, since the user can simultaneously recognize the type of the sound, the orientation of the sound source of the sound relative to the virtual object through the above manner, the user experience is better than that of the related art.

In addition, before providing the visual control on the graphical user interface, the method may further include: determining the sound source of the sound is located within a second preset range and out of a third preset range.

Figure 2:
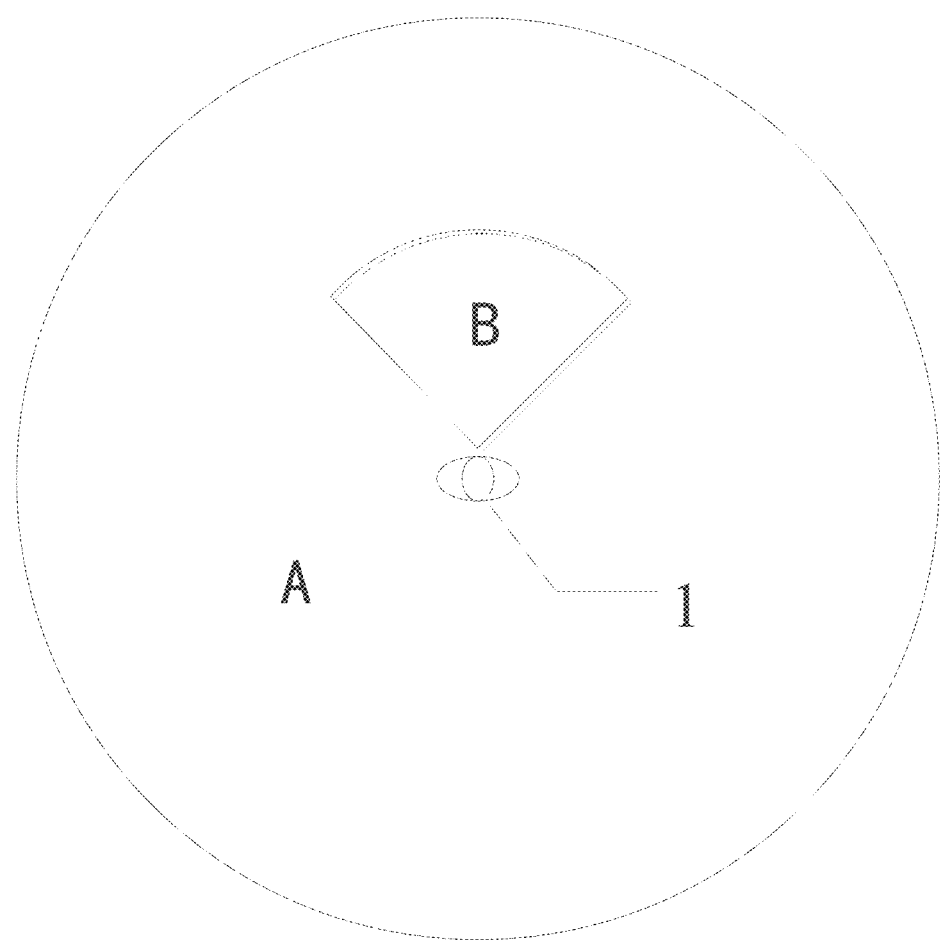
FIG. 2 is a schematic diagram of a second preset range and a third preset range in an exemplary embodiment of the present disclosure.

In the present exemplary embodiment, the second preset range is a range which the virtual object may be affected therein, and the second preset range is a range centered on the virtual object. For example, as shown in FIG. 2, the second preset range A may be a circular area centered on the virtual object 1. In addition, the second preset range may also be as a shape of a square or an elliptical centered on the virtual object which is not specifically limited in the present exemplary embodiment. The third preset range is a range in which a visual field of the virtual object is clear. As shown in FIG. 2, the third preset range B may be a sector-shaped region with the virtual object 1 as a reference point, and an area of the sector-shaped region is set according to the clear range of the visual field of the virtual object. For example, in an environment of game scene with a smooth terrain and rare obstacles, the area of the sector-shaped region may be set relatively larger. For another example, in an environment of game scene with the uneven terrain and many obstacles, the area of the sector-shaped region may be an area of the sector-shaped region after subtracting the parts of the obstacles or the uneven terrain.

When a position of the sound source of the sound is acquired, it is determined whether a positron coordinate of the sound source of the sound is located within the second preset range and out of the third preset range; when it is determined that the position coordinate of the sound source of the sound is located within the second preset range and out of the third preset range, the visual control is displayed on the graphical user interface; and when it is determined that the position coordinate of the sound source of the sound is out of the second preset range or within the third preset range, the visual control is not displayed on the graphical user interface.

Through the above manners, when the position of the sound source of the sound is far away from the virtual object, the sound may not affect the virtual object in a short time. For example, a gunshot sound far away from the virtual object does not pose a threat to the virtual object in a short time, therefore, by setting the second preset range (i.e., a range which the virtual object may be affected therein), and displaying the visual control only when the position of the sound source of the sound is located within the second preset range. Accordingly, a display logic is optimized and redundant design of the visual control is simplified. Moreover, when the position of the sound source of the sound is located within the third preset range (i.e., the position of the sound source of the sound is located within a clear visual range of the virtual object, wherein the virtual object controlled by the user may clearly capture the virtual source, such as non-player character, enemy character, virtual building, or the like, in such clear visual range of the game scene), the user can clearly obtain the position of the sound source of the sound. Therefore, the visual control is not displayed on the graphical user interface, and the visual control is only displayed when the position of the sound source of the sound is out of the third preset range (i.e., the position of the sound source of the sound is out of the visual clear range of the virtual object), so that the display logic is further optimized and the redundant design of the visual control is simplified.

Figure 3:
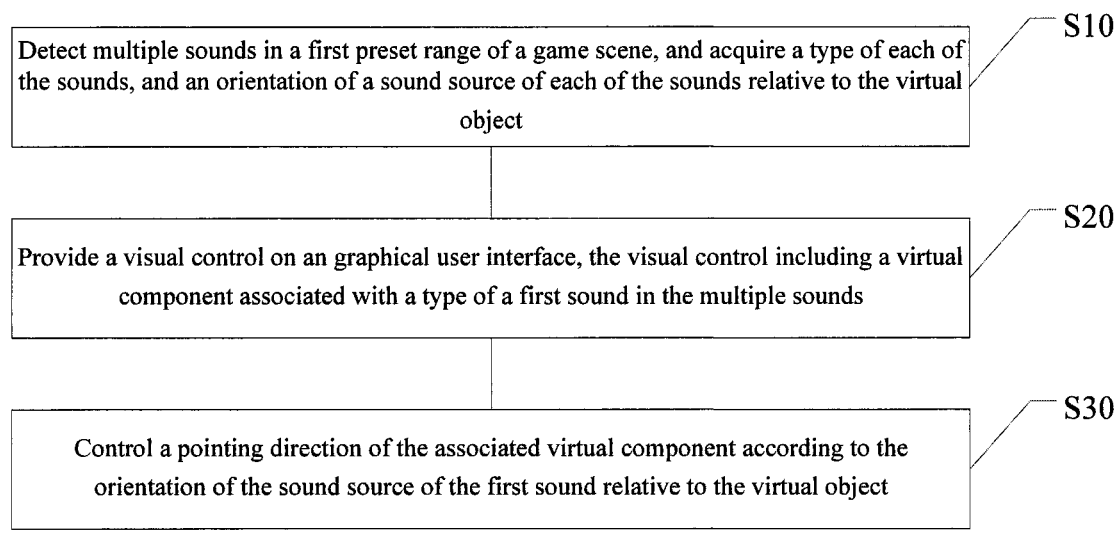
FIG. 3 is a second flow chart of a visual method for compensating sound information according to the present disclosure.

The exemplary embodiments of the present disclosure further disclose a visual method for compensating sound information, applied to a touch terminal capable of presenting a graphical user interface, the graphical user interface at least partially including a game scene, and at least part of a virtual object. The touch terminal may be, for example, an electronic device having a touch screen such as a mobile phone, a tablet computer, a laptop computer, a game machine, or a PDA. A game application may be executed on the touch terminal, through an application program interface of the touch terminal, a graphical user interface (GUI) is rendered on the touch screen, so as to display a virtual object and a virtual joystick area including a virtual joystick, a virtual battle scene, a virtual natural environment, etc. The GUI may either be occupied an entire area of the touch screen or just a partial area, which is not specifically limited in the exemplary embodiments. The virtual object refers to a game character controlled by the user, and is displayed on the GUI with a partial or overall form of the game character. For example, in a first person perspective, the content of GUI is displayed by a master perspective of the user, which enhances the immersive experience of the user and only a part of the game character, such as a hand or a foot, may be shown on the GUI; while in a third-person perspective, the game character may be presented in the GUI as a whole, which reduces the difficulty of game manipulation and dizziness of the user, and emphasizes the sense of movement m the game. The developer may determine the specific display manner according to the game contents, which will not be limited in the present disclosure. As shown in FIG. 3, the visual display method for compensating sound information may include the following steps.

In S10, a plurality of sounds in a first preset range in the game scene are detected, and a type of each of the sounds and an orientation of a sound source of each of the sounds relative to the virtual object are acquired.

In the present exemplary embodiment, a size of the first preset range may be set by a developer according to game contents. For instance, the first preset range may be a range determined according to an auditory range of a virtual object, and may also be an entire area of the game scene, or an area of the game scene currently displayed on the GUI, or the like.

The plurality of sounds in the game scene may be detected by a detection module at a preset period, and the preset period may be set by the developer but to ensure the accuracy of sound detection, the preset period cannot be too long.

The types of the plurality of sounds may be respectively acquired by a sound type acquisition module. The type of the sound may be the sound of a footstep, a conversation, a door opening, a gunshot, and a fighting, etc., which is not specifically limited in the present exemplary embodiment.

It is possible to acquire coordinates of the sound source of each sound and coordinates of the virtual object, and then calculate the distance between the sound source of the sound and the virtual object or the orientation of the sound source of each sound relative to the virtual object according to the coordinates of the sound source of each sound and the coordinates of the virtual object.

The plurality of sounds may be three, or four, or five, which is not specifically limited in the exemplary embodiments. The types of the plurality of sounds may be completely identical, or completely different, or may not be completely identical.

In step S20, a visual control is provided on the graphical user interface, the visual control including a virtual component associated with a type of a first sound in the plurality of sounds.

In the present exemplary embodiment, a position of the visual control may be any position on the graphical user interface, for example, may be at the lower right of the graphical user interface, or may be at the upper left of the graphical user interface, which is specifically limited in the exemplary embodiments.

The plurality of sounds may be sequentially sorted in a preset manner, and a sound ranked first is determined as the first sound. The preset manner may be that the sounds are sorted according to the distances between the sound sources of the sounds and the virtual object from the near to the distant, in this way, the sound closest to the virtual object is ranked as the first, and the virtual object farthest to the virtual object is ranked as the last. The preset manner may also be that the sounds are sorted according to threat levels of the sounds to the virtual object in a descending order, in this way, the sound having a highest threat level to the virtual object is ranked as the first, and the virtual object having a lowest threat level to the virtual object is ranked as the last. It should be noted that the preset manner in the exemplary embodiment is not limited thereto.

In the present exemplary embodiment, the virtual component may include an ideographic image and a direction identifier, the ideographic image is corresponding to the type of the first sound, and a pointing direction of the direction identifier is consistent with the orientation of the sound source of the first sound relative to the virtual object. The ideographic image and the direction identifier in the virtual component described above may enable the user to acquire the type of the first sound and the orientation of the sound source of the first sound relative to the virtual object.

The virtual component may further include an ideographic image and plurality of direction identifiers, the number of the plurality of direction identifiers being the same as that of the plurality of sounds. The ideographic image is corresponding to the type of the first sound, and the plurality of direction identifiers are in one-to-one correspondence with the plurality of sounds. That is, one direction identifier corresponds to one sound, and one sound corresponds to one direction identifier. By the ideographic image in the virtual component and the plurality of direction identifiers with a number same as that of the plurality of sounds, the user can acquire the type of the first sound and the orientation of the sound source of each sound relative to the virtual object. Based on this, to make the user quickly distinguish the orientation of the sound source of the first sound relative to the virtual object from the plurality of direction identifiers, the direction identifier indicating the orientation of the sound source of the first sound relative to the virtual object and the direction indicator indicating the orientations of the sound sources of other sounds relative to the virtual object may be displayed distinctively.

It should be noted that, since the ideographic image and the direction identifier have been described in detail in the visual method for compensating sound information described in FIG. 1 above, details will not be elaborated herein.

In step S30, a pointing direction of the virtual component is controlled according to an orientation of the sound source of the first sound relative to the virtual object.

In the present exemplary embodiment, the virtual component may include an ideographic image and a direction identifier. In this case, by controlling the pointing direction of the direction identifier in the virtual component according to the orientation of the sound source of the first sound relative to the virtual object, the user can acquire the orientation of the sound source of the first sound relative to the virtual object according to the direction identifier.

Also, the virtual component may include an ideographic image and a plurality of direction identifiers, a number of the plurality of direction identifiers being the same as that of the plurality of sounds, wherein the ideographic image is corresponding to the type of the first sound, and the plurality of direction identifiers are in one-to-one correspondence with the plurality of sounds. In this case, according to the orientation of the sound source of each of the sounds relative to the virtual object, the pointing direction of each of the corresponding direction identifiers may be controlled, i.e., one direction identifier corresponds to the orientation of the sound source of one sound relative to the virtual object. Through the above-mentioned manners, the user can acquire the orientation of the sound source of each sound relative to the virtual object according to the pointing direction of each direction identifier.

In an embodiment, the visual method for compensating sound information may further include: acquiring a distance between the sound source of the first sound and the virtual object; and controlling a display form of the virtual component according to the distance between the sound source of the first sound and the virtual object.

In the present exemplary embodiment, a display form of a transparency of the virtual component may be controlled according to the distance between the sound source of the first sound and the virtual object, wherein the further the distance is, the higher the transparency is, and the closer the distance is, the lower the transparency is. A display form of a size of the virtual component may be controlled according to the distance between the sound source of the first sound and the virtual object, wherein the further the distance is, the smaller the virtual component is; and the closer the distance is, the larger the virtual component is. A display form of a brightness of the virtual component may also be controlled according to the distance between the sound source of the first sound and the virtual object, wherein the further the distance is, the lower the brightness is, and the closer the distance is, the higher the brightness is. By controlling the display form of the virtual component according to the distance between the sound source of the first sound and the virtual object, the user can acquire the distance between the sound source of the first sound and the virtual object according to the display form of the virtual component.

When the virtual component includes an ideographic image and a direction identifier, a display form of the ideographic image and/or the direction identifier may be controlled according to the distance between the sound source of the first sound and the virtual object. To be specific, a display form of a transparency of the ideographic image and/or the direction identifier may be controlled according to the distance between the sound source of the first sound and the virtual object. A display form of a size of the ideographic image and/or the direction identifier may also be controlled according to the distance between the sound source of the first sound and the virtual object. It may be known from the above that the user may acquire the distance between the sound source of the first sound and the virtual object by the display form of the ideographic image and/or the direction identifier.

When the virtual component includes an ideographic image and a plurality of direction identifiers having a number same as that of the plurality of sounds, a display form of the ideographic image and/or the direction identifier corresponding to the first sound may be controlled according to the distance between the sound source of the first sound and the virtual object. To be specific, a display form of a transparency of the ideographic image and/or the direction identifier corresponding to the first sound may be controlled according to the distance between the sound source of the first sound and the virtual object. A display form of a size of the ideographic image and/or the direction identifier corresponding to the first sound may also be controlled according to the distance between the sound source of the first sound and the virtual object. It may be known from the above that the user may acquire the distance between the sound source of the first sound and the virtual object by the display form of the ideographic image and/or the direction identifier corresponding to the first sound.

Moreover, when the virtual component includes an ideographic image and a plurality of direction identifiers having a number same as that of the plurality of sounds, a display form of the direction indicator associated with a respective one of the sounds may be controlled according to the distance between the sound source of the respective one of the sounds and the virtual object. To be specific, the display form of the transparency of the direction indicator associated with a respective one of the sounds may be controlled according to the distance between the sound source of the respective one of the sounds and the virtual object, or the display form of the size of the direction indicator associated with a respective one of the sounds may be controlled according to the distance between the sound source of the respective one of the sounds and the virtual object. It may be known from the above that the user can respectively acquire the distances between the sound sources of individual sounds and the virtual object by the display forms of the direction identifiers corresponding to individual sounds.

The above process will be described hereinafter by taking the number of the plurality of sounds is three as an example.

Figure 4:
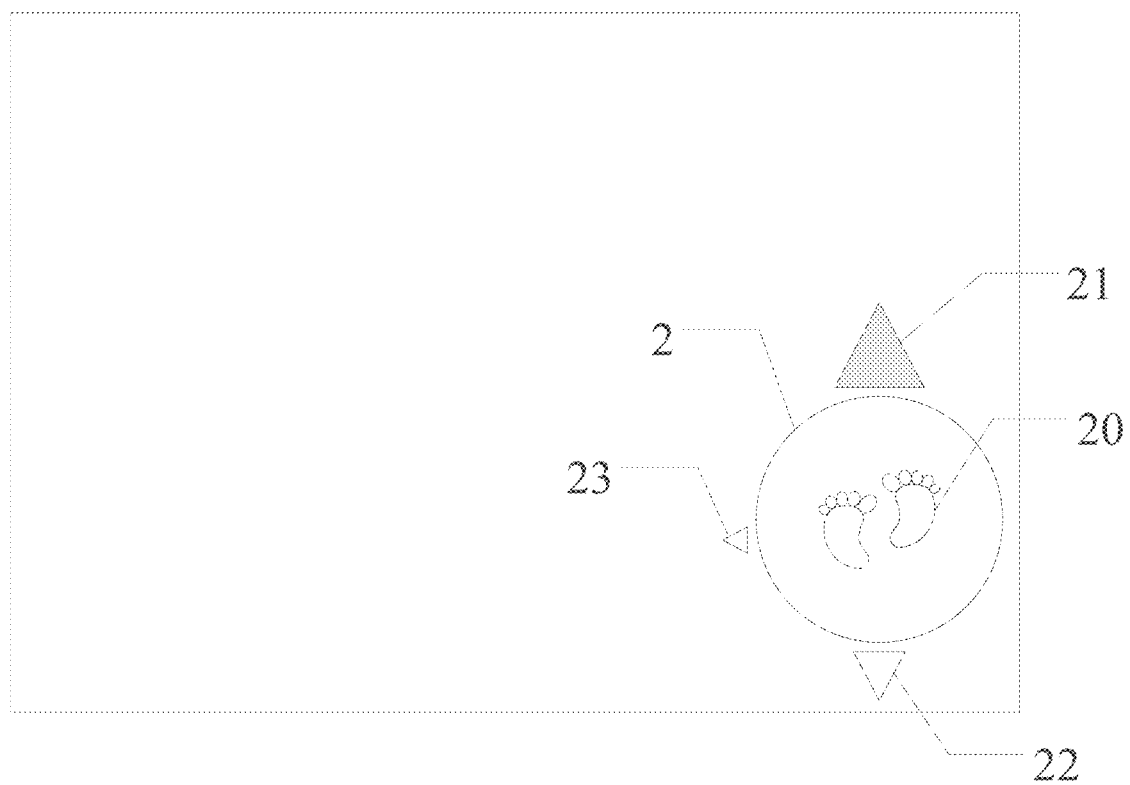
FIG. 4 is a schematic diagram of displaying one visual control in an exemplary embodiment of the present disclosure.

For example, the above three sounds are respectively a first sound, a second sound, and a third sound, wherein types of the first to third sounds are sound of a footstep, a gunshot, and a door opening respectively, distances between sound sources of the first to third sounds and the virtual objects are 10 m, 20 m, and 30 m respectively, and orientations of the sound sources of the first to third sounds relative to the virtual object are front, back and left respectively. Based on this, the first to third sounds are sorted in a manner from the near to the distant according to the distance between the sound source of the sound and the virtual object. It can be seen that the first sound is ranked in the first. As shown in FIG. 4, the visual control 2 in the figure includes a virtual component. The virtual component includes one ideographic image 20 and three direction identifiers, wherein a shape of the ideographic image 20 is consistent with the type of the first sound, i.e., a shape of feet or an icon of a costumed shoe. The three direction indicators are a first direction indicator 21, a second direction indicator 22, and a third direction indicator 23 respectively. The first direction indicator 21 indicates an orientation of a sound source of the first sound relative to the virtual object, so that, a direction of the first direction indicator points to the front. The second direction indicator 22 indicates an orientation of a sound source of the second sound relative to the virtual object, so that, a direction of the second direction indicator points to the back. The third direction indicator 23 indicates an orientation of a sound source of the third sound relative to the virtual object, so that, a direction of the third direction indicator points to the left. In FIG. 4, sizes of the first to third direction identifiers are respectively controlled according to the distances between the sound sources of the first to third sounds and the virtual object, wherein the further the distance is, the smaller the direction identifier is; and the closer the distance is, the larger the direction identifier is. Therefore, the size of the first direction identifier 21 is larger than the size of the second direction identifier 22, and the size of the second direction identifier 22 is larger than the Size of the third direction identifier 23. It should be noted that, in FIG. 4, the first direction identifier 21 is filled with a colon while the second direction identifier 22 and the third direction identifier 23 are not filled with color, so that the user could distinguish the first direction identifier 21 as the direction identifier corresponding to the first sound according to the color.

Figure 5:
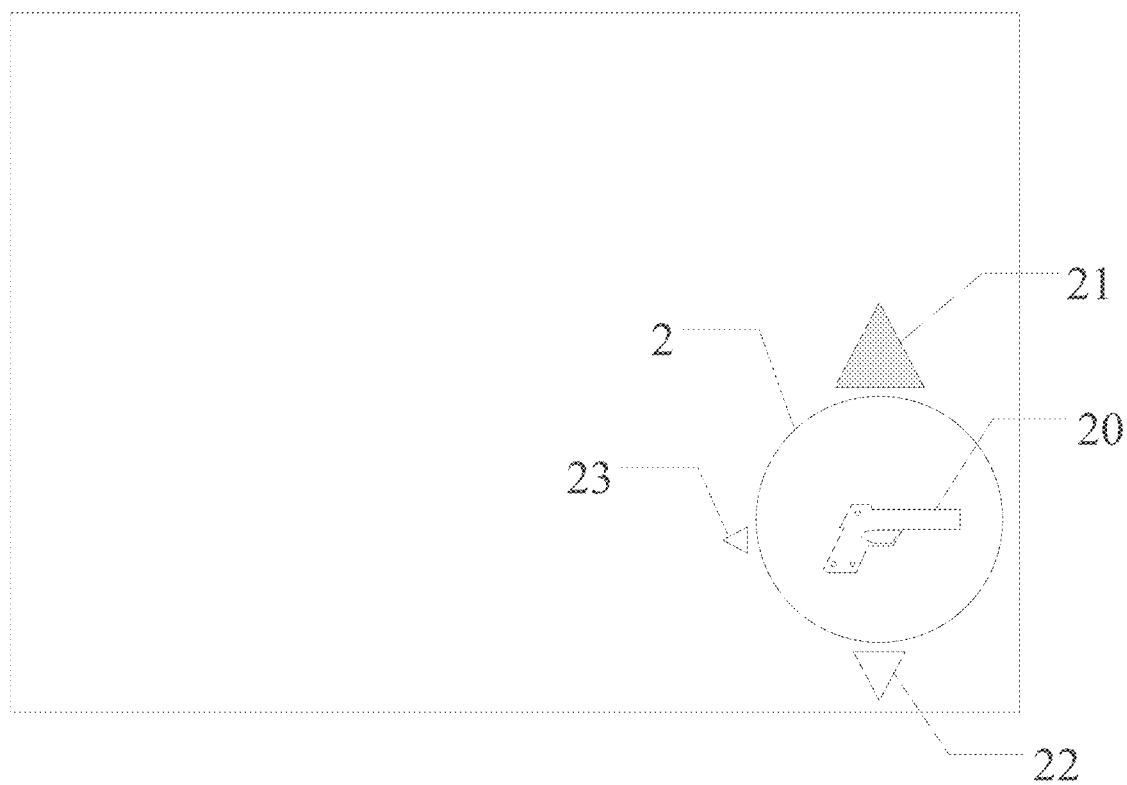
FIG. 5 is schematic diagram of displaying one visual control in another exemplary embodiment of the present disclosure.

For another example, the above three sounds are respectively a first sound, a second sound, and a third sound, wherein types of the first to third sounds are all the sound of footstep, distances between sound sources of the first to third sounds and the virtual objects are 10 m, 20 m, and 30 m respectively, and orientations of the sound sources of the first to third sounds relative to the virtual object are front, back and left respectively. Based on this, the first to third sounds are sorted in a manner from the near to the distant according to the distance between the sound source of the sound and the virtual object. It can be seen that the first sound is ranked in the first. As shown in FIG. 5, the visual control 2 in the figure includes a virtual component. The virtual component includes one ideographic image 20 and three direction identifiers, wherein a shape of the ideographic image 20 is consistent with the type of the first sound, i.e., a shape of a gun or a bullet. The three direction indicators are a first direction indicator 21, a second direction indicator 22, and a third direction indicator 23 respectively. The first direction indicator 21 indicates an orientation of a sound source of the first sound relative to the virtual object, so that, a direction of the first direction indicator points to the front. The second direction indicator 22 indicates an orientation of a sound source of the second sound relative to the virtual object, so that a direction of the second direction indicator points to the back. The third direction indicator 23 indicates an orientation of a sound source of the third sound relative to the virtual object, so that, a direction of the third direction indicator points to the left. In FIG. 5, sizes of the first to third direction identifiers are respectively controlled according to the distances between the sound sources of the first to third sounds and the virtual object, wherein the further the distance is, the smaller the direction identifier is; and the closer the distance is, the larger the direction identifier is. Therefore, the size of the first direction identifier 21 is larger than the size of the second direction identifier 22, and the size of the second direction identifier 22 is larger than the size of the third direction identifier 23. It should be noted that, in FIG. 5, the first direction identifier 21 is filled with a color, while the second direction identifier 22 and the third direction identifier 23 are not filled with colors, so that the user could distinguish the first direction identifier 21 as the direction identifier corresponding to the first sound according to the color.

In conclusion, when a plurality of sounds In the game scene are detected in the, the type of the first sound in the plurality of sounds, and the orientation of the sound source of the first sound relative to the virtual object are displayed by the virtual component associated with the type of the first sound in the plurality of sounds, the display form of the virtual component, and the pointing direction of the virtual component, such that the user can identify the type of the first sound, and the orientation of the sound source of the first sound relative to the virtual object in a noisy environment by means of the virtual component associated with the type of the first sound, the display form of the virtual component, and the pointing direction of the virtual component.

Alternatively, when a plurality of sounds in the game scene are detected, the type of the first sound in the plurality of sounds, and the orientations of the sound sources of the plurality of sounds relative to the virtual object are displayed by the virtual component associated with the type of the first sound in the plurality of sounds, the pointing directions of the plurality of direction identifiers having a number same as that of the plurality of sounds m the virtual component, and the display forms of the plurality of direction identifiers having a number same as that of the plurality of sounds in the virtual component, such that the user can identify the type of the first sound, and the orientations of the sound sources of the plurality of sounds relative to the virtual object in a noisy environment by means of the virtual component associated with the type of the first sound, the pointing directions of the plurality of direction identifiers having a number same as that of the plurality of sounds in the virtual component, and the display forms of the plurality of direction identifiers having a number same as that of the plurality of sounds in the virtual component.

Figure 6:
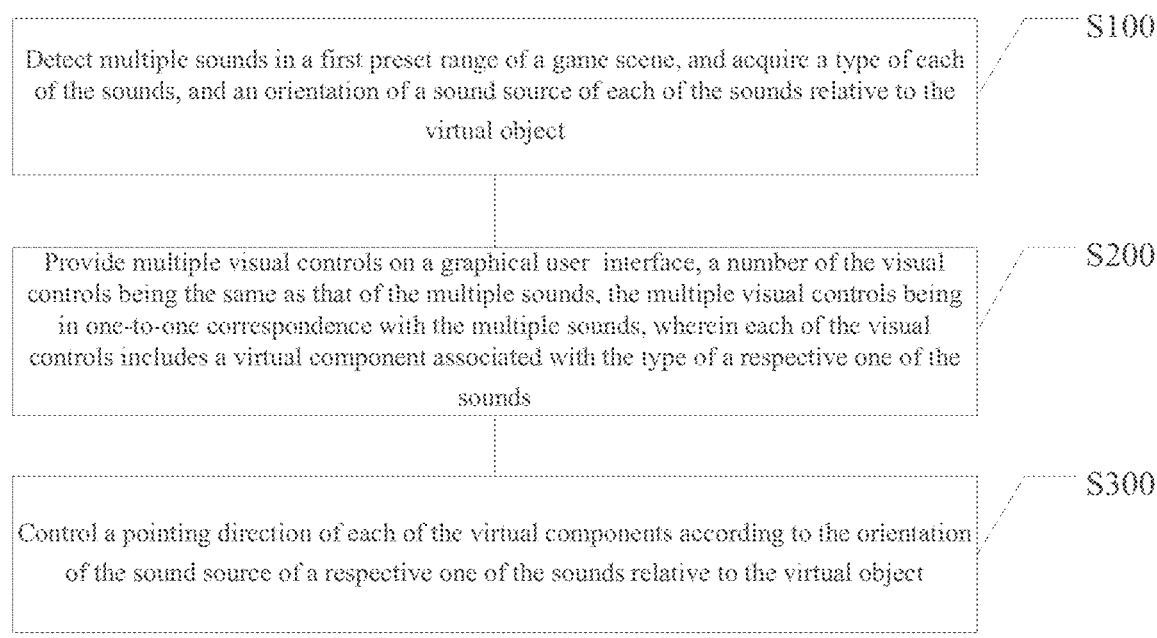
FIG. 6 is a third flow chart of a visual method for compensating sound information according to the present disclosure.

The exemplary embodiments of the present disclosure further disclose a visual method for compensating sound information, applied to a touch terminal capable of presenting a graphical user interface, the graphical user interlace at least partially including a game scene, and at least part of a virtual object. The touch terminal may be, for example, an electronic device having a touch screen such as a mobile phone, a tablet computer, a laptop computer, a game machine, or a PDA. A game application may be executed on the touch terminal, through an application program interface of the touch terminal, a graphical user interface (GUI) is rendered on the touch screen, so as to display a virtual object and a virtual joystick area including a virtual joystick, a virtual battle scene, a virtual natural environment, etc. The GUI may either be occupied an entire area of the touch screen or just a partial area, which is not specifically limited in the exemplary embodiments. The virtual object refers to a game character controlled by the user, and is displayed on the GUI with a partial or overall form of the game character. For example, in a first person perspective, the content of GUI is displayed by a master perspective of the user, which enhances the immersive experience of the user, and only a part of the game character; such as a band or a toot, may be shown on the GUT, while in a third-person perspective, the game character may be presented in the GUI as a whole, which reduces the difficulty of game manipulation and dizziness of the user, and emphasizes the sense of movement in the game. The developer may determine the specific display manner according to the game contents, which will not be limited in the present disclosure. As shown in FIG. 6, the visual method for compensating sound information may include the following steps.

In S100, a plurality of sounds in a first preset range of the game scene are detected, and a type of each of the sounds and an orientation of a sound source of each of the sounds relative to the virtual object are acquired.

In the exemplary embodiment, since the above steps have been described in detail in step S10 of the visual method for compensating sound information described in FIG. 3, details will not be elaborated herein.

In step S200, a plurality of visual controls are provided on the graphical user interface, a number of the plurality of visual controls being the same as that of the plurality of sounds, wherein the plurality of visual controls are in one-to-one correspondence with the plurality of sounds, and each of the visual controls includes a virtual component associated with the type of a respective one of the sounds.

In the exemplary embodiment, the number of the visual controls is the same as the number of the sounds, one sound corresponds to one visual control only, and one visual control also corresponds to one sound only.

Each of the virtual components may include an ideographic image and a direction identifier. The ideographic image in the virtual component is consistent with the type of the sound associated with the virtual component, and the direction identifier in the virtual component is consistent with an orientation of the sound source of the sound associated with the virtual component relative to the virtual object.

It should be noted that, since the ideographic image and the direction identifier have been relationally described in detail in the visual method for compensating sound information described in FIG. 1 above, details will not be elaborated herein.

In step S300, a pointing direction of each of the virtual components is controlled according to the orientation of the sound source of a respective one of the sounds relative to the virtual object.

In the exemplary embodiment, when the virtual component includes an ideographic image and a direction identifier, and a pointing direction of the direction indicator in each of the virtual components may be controlled according to the orientation of the sound source of a respective one of the sounds relative to the virtual object.

In an embodiment, the visual method for compensating sound information may further include: acquiring a distance between a sound source of a respective one of the sounds and the virtual object; and controlling a display form of each of the virtual components according to the distance between the sound source of a respective one of the sounds and the virtual object.

In the exemplary embodiment, a display form of a transparency of each of the virtual components may be controlled according to the distance between the sound source of a respective one of the sounds and the virtual object. A display form of a size of each of the virtual components may also be controlled according to the distance between the sound source of a respective one of the sounds and the virtual object.

When each of the virtual components includes an ideographic image and a direction identifier, the controlling the display form of each of the virtual components according to the distance between sound source of a respective one of the sounds and the virtual object may include: controlling a display form of a size of the ideographic image and/or the direction identifier in each of the virtual components according to the distance between the sound source of a respective one of the sounds and the virtual object. To be specific, a display form of the transparency of the ideographic image and/or the direction indicator in each of the virtual components may be controlled according to the distance between the sound source of a respective one of the sounds and the virtual object, or a display form of a size of the ideographic image and/or the direction indicator in each of the virtual components may be controlled according to the distance between the sound source of a respective one of the sounds and the virtual object.

The above process will be described hereinafter by taking the plurality of sounds as three sounds for example.

Figure 7:
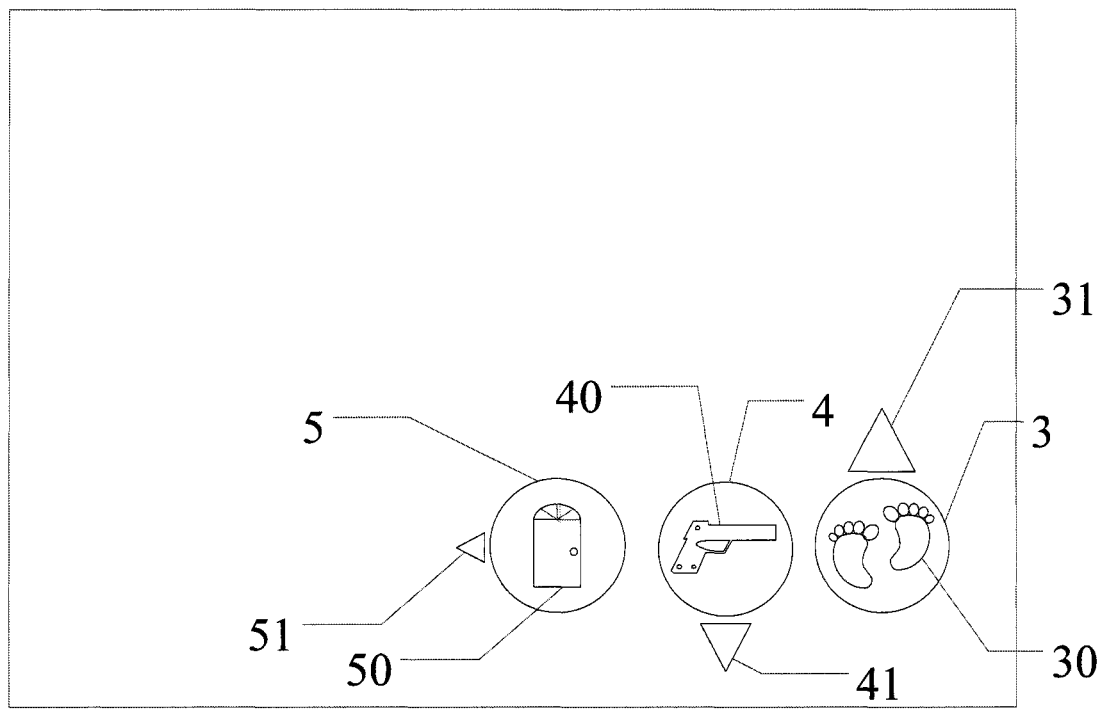
FIG. 7 is a schematic diagram of displaying three visual controls in an exemplary embodiment of the present disclosure.

For example, the above three sounds are respectively a first sound, a second sound, and a third sound, wherein types of the first to third sounds are sound of a footstep, a gunshot, and a door opening respectively, distances between sound sources of the first to third sounds and the virtual objects are 10 m, 20 m, and 30 m respectively, and orientations of the sound sources of the first to third sounds relative to the virtual object are front, back and left respectively. As shown in FIG. 7, there are three visual controls, which are respectively a first visual control 3, a second visual control 4, and a third visual control 5. The first visual control 3 includes a first virtual component associated with a type of the first sound, the second visual control 4 includes a second virtual component associated with a type of the second sound, and the third visual control 5 includes a third virtual component associated a type of the third sound. The first virtual component includes a first ideographic image 30 associated with the type of the first sound, and a first direction identifier 31 consistent with an orientation of a sound source of the first sound relative to die virtual object, wherein the first ideographic image 30 is in a shape of feet or an icon of a costumed shoe, and the first direction indicator 31 points to the front. The second virtual component includes a second ideographic image 40 associated with the type of the second sound and a second direction identifier 41 consistent with an orientation of a sound source of the second sound relative to the virtual object, wherein the second ideographic image 40 is in a shape of a gun or a bullet, and the second direction identifier 41 points to the back. The third virtual component includes a third ideographic image 50 associated with the type of the third, sound, and a third direction identifier 51 consistent with an orientation of a sound source of the third sound relative to the virtual object, wherein the third ideographic image 50 is in a shape of doors, and the third direction indicator 51 points to the left. The distances between the sound sources of the first to third sounds and the virtual object are displayed by the sizes of the first to third direction identifiers in FIG. 7. Therefore, the size of the first direction identifier 31 is larger than the size of the second direction identifier 41, and the size of the second direction indicator 41 is larger than the size of the third direction indicator 51.

Figure 8:
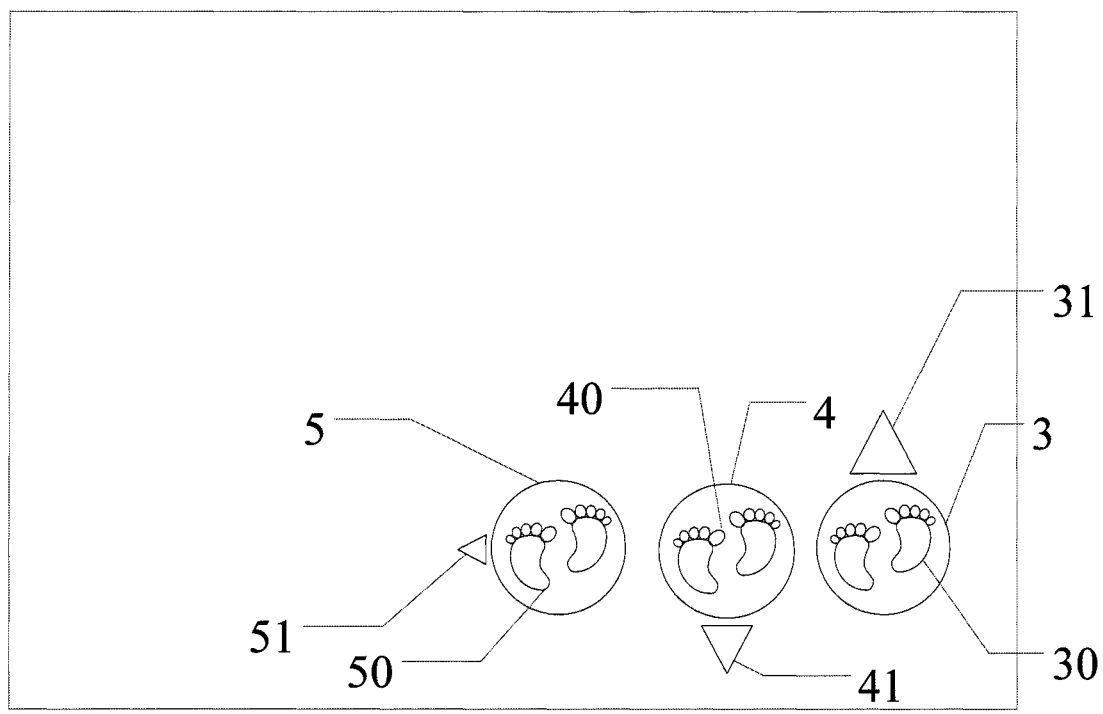
FIG. 8 is a schematic diagram of displaying three visual controls in another exemplary embodiment of the present disclosure.

For another example, the above three sounds are respectively a first sound, a second sound, and a third sound, wherein types of the first to third sounds are all footstep sounds, distances between sound sources of the first to third sounds and the virtual objects are 10 m, 20 m, and 30 m respectively, and orientations of the sound sources of the first to third sounds relative to the virtual object are front, back and left respectively. As shown in FIG. 8, there are three visual controls, which are respectively a first visual control 3, a second visual control 4, and a third visual control 5. The first visual control 3 includes a first virtual component associated with a type of the first sound, the second visual control 4 includes a second virtual component associated with a type of the second sound, and the third visual control 5 includes a third virtual component associated a type of the third sound. The first virtual component includes a first ideographic image 30 associated with the type of the first sound and a first direction identifier 31 consistent with an orientation of a sound source of the first sound relative to the virtual object, wherein the first ideographic image 30 is in a shape of feet or an icon of a costumed shoe, and the first direction indicator 31 points to the front. The second virtual component includes a second ideographic image 40 associated with the type of the second sound and a second direction identifier 41 consistent with an orientation of a sound source of the second sound relative to the virtual object, wherein the second ideographic image 40 is in a shape of feet or an icon of a costumed shoe, and the second direction identifier 41 points to the back. The third virtual component includes a third ideographic image 50 associated with the type of the third sound and a third direction identifier 51 consistent with an orientation of a sound source of the third sound relative to the virtual object, wherein the third ideographic image 50 is in a shape of feet or an icon of a costumed shoe, and the third direction indicator 51 points to the left. The distances between the sound sources of the first to third sounds and the virtual object are displayed by the sizes of the first to third direction identifiers in FIG. 8. Therefore, the size of the first direction identifier 31 is larger than the size of the second direction identifier 41, and the size of the second direction indicator 41 is larger than the size of the third direction indicator 51.

In conclusion, in the case that plurality of sounds are detected, by displaying the visual controls having a number same as that of the plurality of sounds, and according to the virtual components associated with the types of the respective one of the sounds in the visual control, the display forms of the virtual components and the pointing directions of the virtual components, the user can acquire the type of each sound, and the distance or the orientation of the sound source of each sound relative to the virtual object according to the virtual components associated with the types of the respective one of the sounds in the visual control, the display forms of the virtual components and the pointing directions of the virtual components.

It should be noted that although the respective steps of the method of the present disclosure are described in a particular sequence in the drawings, this does not require or imply that these steps must be performed in the particular sequence or that all of the illustrated steps have to be performed in order to achieve the expected results. Additionally or alternatively, certain steps may be omitted, a plurality of steps may be combined into one step to execute, and/or one step may be divided into a plurality of steps to execute, etc.

Figure 9:
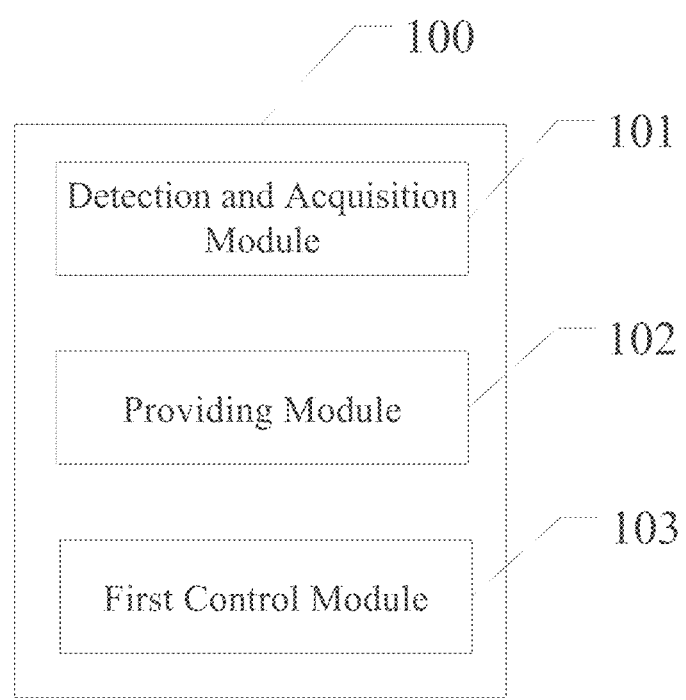
FIG. 9 is a block diagram of a visual apparatus for compensating sound information according to the present disclosure.

The exemplary embodiments of the present disclosure further provide a visual apparatus for compensating sound information, applied to a touch terminal capable of presenting a graphical user interface, the graphical user interface at least partially including a game scene, and at least partially including a virtual object. As shown in FIG. 9, the visual apparatus for compensating sound information 100 may include a detection and acquisition module 101, a providing module 102, and a first control module 103.

The detection and acquisition module 101 may be configured to detect a sound in a first preset range in the game scene, and acquire a type of the sound, and an orientation of a sound source of the sound relative to the virtual object.

The providing module 102 may be configured to provide a visual control on the graphical user interface, the visual control Including a virtual component associated with the type of the sound.

The first control module 103 may be configured to control a pointing direction of the virtual component according to the orientation of the sound source of the sound relative to the virtual object.

The visual apparatus may further include a second control module 104. The second control module 104 may be configured to acquire a distance between a sound source of the sound and the virtual object, and control a display form of the virtual component according to the distance between the sound source of the sound and the virtual object.

The specific details of various visual apparatus modules for compensating sound information in the above have been described in detail in the corresponding visual methods for compensating sound information, and therefore will not be elaborated herein.

The exemplary embodiments of the present disclosure further provide a visual apparatus for compensating sound information, applied to a touch terminal capable of presenting a graphical user interface, the graphical user interface at least partially including a game scene, and at least partially including a virtual object. The apparatus may include: a detection and acquisition module, a providing module, and a first control module.

The detection and acquisition module may be configured to detect a plurality of sounds in a first preset range in the game scene, and acquire a type of each of the sounds, and an orientation of a sound source of each of the sounds relative to the virtual object.

The providing module may be configured to provide a visual control on the graphical user interface, the visual control including a virtual component associated with a type of a first sound in the plurality of sounds.

The first control module may be configured to control a pointing direction of the virtual component according to the orientation of the sound source of the first sound relative to the virtual object.

The visual apparatus may further include a second control module. The second control module may be configured to acquire a distance between a sound source of the first sound, and the virtual object, and control a display form of the virtual component according to a distance between the sound source of the first sound and the virtual object.

The specific details of various visual apparatus modules for compensating sound information in the above have been described in detail in the corresponding visual methods for compensating sound information, and therefore will not be elaborated herein.

The exemplary embodiments of the present disclosure further provide a visual apparatus for compensating sound information, applied to a touch terminal capable of presenting a graphical user interface, the graphical user interface at least partially including a game scene, and at least partially including a virtual object. The apparatus may include: a detection and acquisition module, a providing module, and a first control module.

The detection acquisition module may be configured to detect a plurality of sounds in a first preset range in the game scene, and acquire a type of each of the sounds, and an orientation of a sound source of each of the sounds relative to the virtual object.

The providing module may be configured to provide a plurality of visual controls having a number same as that of the plurality of sounds on the graphical user interface, wherein the plurality of visual controls are in one-to-one correspondence with the plurality of sounds, and each of the visual controls includes a virtual component associated with the corresponding type of each of the sounds.

The first control module may be configured to control a pointing direction of each of the virtual components according to the orientation of the sound source of a respective one of the sounds relative to the virtual object.

The visual apparatus may further include a second control module. The second control module may be configured to acquire a distance between a sound source of a respective one of the sounds and the virtual object, and control a display form of each of the virtual components according to the distance between the sound source of a respective one of the sounds and the virtual object.

The specific details of various visual apparatus modules for compensating sound information in the above have been described in detail in the corresponding visual methods for compensating sound information, and therefore will not be elaborated herein.

It should be noted that although a plurality of modules or units of the device for execution have been mentioned in the detailed description above, this division is not mandatory. In fact, according to the embodiments of the present disclosure, the features and functions of the two or more modules or units described above may be embodied in one module or unit. On the contrary, the features and functions of one module or unit described above may be further divided to be embodied by a plurality of modules or units.

The exemplary embodiments of the present disclosure further provide an electronic device capable of implementing the above-mentioned method.

Those skilled in the art will appreciate that various aspects or tire present disclosure can be implemented as a system, method, or program product. Accordingly, various aspects of the present disclosure may be concretely embodied in the following forms, i.e., a complete hardware implementation, a complete software implementation (including firmware, microcode, etc.), or a combination of hardware and software implementations, which may be collectively referred to as "circuits", "modules", or "systems" herein.

An electronic device 600 according to such an embodiment of the present disclosure is described below with reference to FIG. 10. The electronic device 600 shown in FIG. 10 is merely an example and should not impose any limitation on the function and scope of use of the embodiments of the present disclosure.

Figure 10:
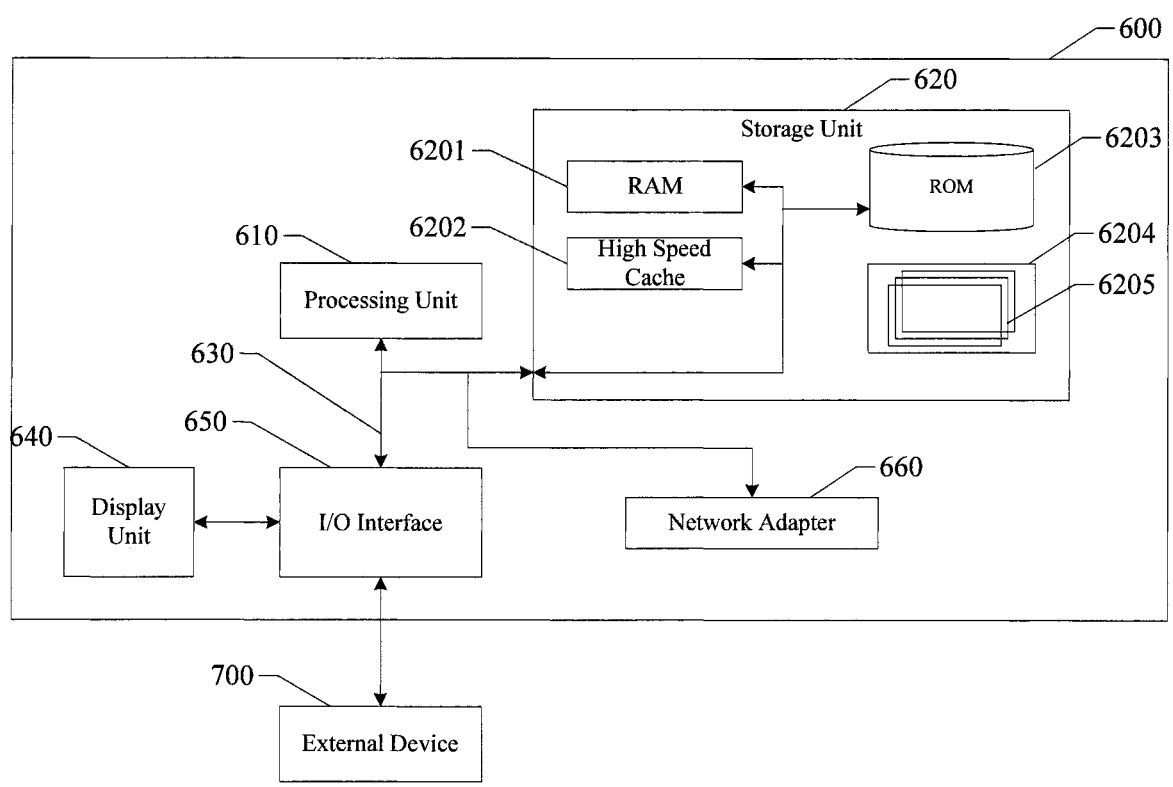
FIG. 10 is a module schematic diagram of an electronic device in exemplary embodiment of the present disclosure.

As shown in FIG. 10, the electronic device 600 is embodied in the form of a general purpose computing device. Components of the electronic device 600 may include, but are not limited to: at least one processing unit 610, at least one storage unit 620, a bus 630 connecting different system components (including a storage unit 620 and a processing unit 610), and a display unit 640.

The storage unit stores program codes which may be executed by the processing unit 610, such that the processing unit 610 executes various steps according to various exemplary embodiments of the present disclosure described in the "exemplary method" section of the description. For example, the processing unit 610 may execute the step S1 of detecting a sound in a first preset range in the game scene, and acquiring a type of the sound, and a distance or an orientation of a sound source of the sound relative to the virtual object; the step S2 of providing a visual control on the graphical user interface, the visual control including a virtual component associated with the type of the sound; the step S3 of controlling a pointing direction of the virtual component according to an orientation of the sound source of the sound relative to the virtual object as shown in FIG. 1. For another example, the processing unit 610 may execute the step S10 of detecting a plurality of sounds in a first preset range in the game scene, and acquiring a type of each of the sounds, and a distance or an orientation of a sound source of each of the sounds relative to the virtual object; the step S20 of providing a visual control in an graphical user interface, the visual control including a virtual component associated with a type of a first sound in the plurality of sounds; the step S30 of controlling a pointing direction of the virtual component according to an orientation of the sound source of the first sound relative to the virtual object as shown in FIG. 3. For another example, the processing unit 610 may execute the step S100 of detecting a plurality of sounds in a first preset range in the game scene, and acquiring a type of each of the sounds, and a distance or an orientation of a sound source of each of the sounds relative to the virtual object; the step S200 of providing a plurality of visual controls having a number same as that of the plurality of sounds on the graphical user interface, wherein the plurality of visual controls are in one-to-one correspondence with the plurality of sounds, and each of the visual controls includes a virtual component associated with the type of a respective one of the sounds; the step S300 of controlling a pointing direction of each of the virtual components according to the orientation of the sound source of a respective one of the sounds relative to the virtual object as shown in FIG. 6.

The storage unit 620 may include a readable medium in the form of a volatile storage unit, such as a random access storage unit (RAM) 6201 and/or a high speed cache storage unit 6202, and may further include a read only storage unit (ROM) 6203.

The storage unit 620 may also include a program/utility tool 6204 having a set (at least one) of program modules 6205, such program modules 6205 including but not limited to: an operating system, one or more applications, other program modules, and program data, each or a certain combination of which may include an implementation of a network environment.

The bus 630 may represent one or more of several types of bus structures, including a storage unit bus or a storage unit controller, a peripheral bus, a graphics acceleration port, a processing unit, or a local bus using any of a variety of bus structures.

The electronic device 600 may also communicate with one or more external devices 700 (e.g., a keyboard, a pointing device, a Bluetooth device, etc.), and may also communicate with one or more devices that enable the user to interact with the electronic device 600, and/or communicate with any device (e.g., a router, a modem, etc.) that enables the electronic device 600 to communicate with one or more other computing devices. This communication may be performed via an input/output (I/O) interface 650. Moreover, electronic device 600 may also communicate with one or more networks (e.g., a Local Area Network (LAN), a Wide Area Network (WAN), and/or a public network, such as the Internet) through a network adapter 660. As shown in the figure, the network adapter 660 communicates with other modules of the electronic device 600 via the bus 630. It should be understood that although not shown in the figure, other hardware and/or software modules may be utilized in conjunction with the electronic device 600, including but not limited to: a microcode, a device driver; a redundant processing unit, an external disk drive array, a RAID system, a tape driver, and a data backup storage system, etc.

Through the description of the above embodiments, those skilled in the art will readily understand that the example embodiments described herein may be implemented by software or by software in combination with necessary hardware. Therefore, the technical solutions according to the embodiments of the present disclosure may be embodied in the form of a software product which is stored in a not-volatile storage medium (a CD-ROM, a USB disk, a mobile hard disk, etc.) or a network, including a number of instructions such that a computing device (which may be a personal computer, a server, a terminal device, or a network device, etc.) performs the methods according to the embodiments of the present disclosure.

The embodiments of the present disclosure further provide a computer readable storage medium storing a program product capable of implementing the above methods of the description thereon. In some possible implementations, various aspects of the present disclosure may also be embodied in the form of a program product including a program code for making the terminal device perform the steps according to various exemplary embodiments of the present disclosure described, in the "exemplary method" section of the description when the program product is operated in the terminal device.

Figure 11:
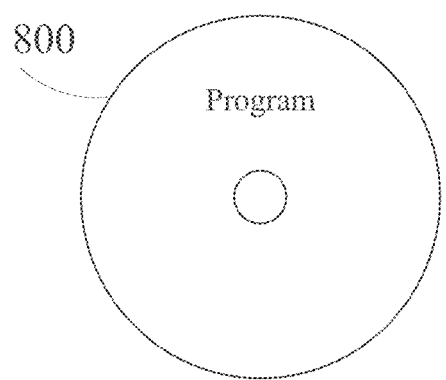
FIG. 11 is a schematic diagram of a program product in an exemplary embodiment of the present disclosure.

Referring to FIG. 11, a program product 800 for implementing the above methods according to the embodiments of die present disclosure, which may employ a portable compact disk read only memory (CD-ROM), includes a program code, and may be operated in a terminal device such as a personal computer, is illustrated. However, the program product of the present disclosure is not limited thereto, and the readable storage medium herein may be any tangible medium that contains or stores a program that may be used by or in connection with an instruction execution system, apparatus, or device.

The program product may employ any combination of one or more readable media. The readable medium may be a readable signal medium or a readable storage medium. The readable storage medium may be, for example, but is not limited to, an electronic, magnetic, optical, electromagnetic, infrared, or semiconductor system, apparatus, or device, or any combination of the above. More specific examples of the readable storage medium (non-exhaustive list) include: an electrical connection with one or more wires, a portable disk, a hard disk, a random access memory (RAM), a read only memory (ROM), an erasable programmable read only memory (EPROM or flash), an optical fiber, a portable compact disk read only memory (CD-ROM), an optical memory device, a magnetic memory device, or any suitable combination of the above.

The computer readable signal medium may include a data signal that is propagated in a baseband or as a part of a carrier, in which a readable program code is carried. Such propagated data signal may take a variety of forms including, but not limited to, an electromagnetic signal, an optical signal, or any suitable combination of the foregoing. The readable signal medium may also be any readable medium other than a readable storage medium, which may transmit, propagate or transport a program for use by or in connection with the instruction execution system, apparatus or device.

The program code included in the readable medium may be transmitted by any suitable medium, including but not limited to wireless, wire, optical cable, RF, etc., or any suitable combination of the above.

The program code for performing the operations of the present disclosure may be written in any combination of one or more programming languages, including an object oriented programming language such as Java, C++, etc., and further including conventional procedural programming language such as "C" language or a similar programming language. The program code can be executed entirely on a user computing device, partially executed on a user device, as a stand-alone software package, partially executed on the user computing device and partially executed on a remote computing device, or entirely executed on the remote computing device or a server. In the case of involving in the remote computing device, the remote computing device can be connected to the user computing device via any kind of network, including a local area network (LAN) or a wide area network (WAN), or can be connected to an external computing device (e.g. connected via the Internet using an internet service provider).

The example embodiments may be embodied in many forms and should not be construed as being limited to the embodiments set forth herein; on the contrary, these embodiments are provided so that the disclosure will be comprehensive and complete, and the concept of the example embodiments will be comprehensively conveyed to those skilled in the art. The same reference numerals in the drawings denote the same or similar parts; therefore, the repeated description thereof will be omitted.

Furthermore, the described features, structures, or characteristics may be combined in any suitable manner in one or more embodiments. In the following description, numerous specific details are set forth, so as to give sufficient understanding on the embodiments of the disclosure. However, those skilled in the art will appreciate that the technical solution of the disclosure may be practiced without one or more of the specific details, or other methods, constituent elements, materials, devices, steps, etc. may be employed. In other instances, well-known structures, methods, apparatuses, implementations, materials, or operations are not illustrated or described in detail to avoid obscuring various aspects of the disclosure.

The block diagrams shown in the drawings are merely functional entities and do not necessarily have to correspond to physically separate entities. In other words, these functional entities may be implemented in software, or these functional entities or a part of the functional entities is implemented in one or more software-hardened modules, or these functional entities are implemented in different network and/or processor apparatuses and/or microcontroller apparatuses.

Moreover, the above-described drawings are merely illustrative of the processes included in the methods according to the exemplary embodiments of the present disclosure, and are not intended to be limiting. It will readily understand that the processes shown in the above drawings do not indicate or limit the chronological order of these processes. In addition, it will also readily understand that these processes may be performed synchronously or asynchronously, for example, in a plurality of modules.

Other embodiments of the present disclosure will be apparent to those skilled In the art after taking the description into consideration and practicing the disclosure disclosed herein. This application is intended to cover any variations, uses, or adaptations of the disclosure following the general principles thereof and including such departures from the present disclosure as come within known or customary practice in the art. The description and embodiments are to be regarded as illustrative only, and the real scope and spirit of the present disclosure are pointed out in the claims.

It will be appreciated that the present disclosure is not limited to the exact construction that has been described above and illustrated in the accompanying drawings, and that various modifications and changes can be made without departing from the scope thereof. The scope of the present disclosure is limited by the appended claims only.

What is claimed is:

1. A visual method for compensating sound information, applied to a touch terminal capable of presenting a graphical user interface, the graphical user interface at least partially comprising a game scene, and at least part of a virtual object, wherein the method comprises:

detecting a sound in a first preset range of the game scene, and acquiring a type of the sound, and an orientation of a sound source of the sound relative to the virtual object;

providing a visual control on the graphical user interface, the visual control comprising a virtual component associated with the type of the sound; and controlling a pointing direction of the virtual component according to the orientation of the sound source of the sound relative to the virtual object, wherein the first preset range is a range determined according to an auditory range of the virtual object, an entire area of the game scene, or an area of the game scene currently displayed on the graphical user interface.

2. The visual method for compensating sound information according to claim 1, wherein the method further comprises:

acquiring a distance between the sound source of the sound and the virtual object; and controlling a display form of the virtual component according to the distance between the sound source of the sound and the virtual object.

3. The visual method for compensating sound information according to claim 1, wherein before the step of providing the visual control on the graphical user interface, the method further comprises:

determining the sound source of the sound is located within a second preset range and out of a third preset range.

4. The visual method for compensating sound information according to claim 1, wherein the virtual component comprises an ideographic image and a direction identifier, the ideographic image is corresponding to the type of the sound, and a pointing direction of the direction identifier is corresponding to the orientation of the sound source of the sound relative to the virtual object.

5. The visual method for compensating sound information according to claim 2, wherein the controlling the display form of the virtual component according to the distance between the sound source of the sound and the virtual object comprises:

controlling a display form of at least one of a transparency, a size, and a brightness of the virtual component according to the distance between the sound source of the sound and the virtual object.

6. A visual method for compensating sound information, applied to a touch terminal capable of presenting a graphical user interface, the graphical user interface at least partially comprising a game scene, and at least part of a virtual object, wherein the method comprises:

detecting a plurality of sounds in a first preset range of the game scene, and acquiring a type of each of the sounds, and an orientation of a sound source of each of the sounds relative to the virtual object;

providing a visual control on the graphical user interface, the visual control comprising a virtual component associated with a type of a first sound in the plurality of sounds; and controlling a pointing direction of the virtual component according to the orientation of the sound source of the first sound relative to the virtual object, wherein the first preset range is a range determined according to an auditory range of the virtual object, an entire area of the game scene, or an area of the game scene currently displayed on the graphical user interface.

7. The visual method for compensating sound information according to claim 6, wherein the virtual component comprises an ideographic image and a plurality of directional identifiers, the number of the directional identifiers is the same as the sounds, the ideographic image is corresponding to the type of the first sound, and the plurality of direction identifiers are provided in one-to-one correspondence with the plurality of sounds; and the step of controlling the pointing direction of the virtual component according to the orientation of the sound source of the first sound relative to the virtual object comprises:

controlling a pointing direction of each of the direction identifiers according to the orientation of the sound source of a respective one of the sounds relative to the virtual object.

8. The visual method for compensating sound information according to claim 6, wherein the method further comprises:

acquiring a distance between the sound source of the first sound and the virtual object; and controlling a display form of the virtual component according to the distance between the sound source of the first sound and the virtual object.

9. A visual method for compensating sound information, applied to a touch terminal capable of presenting a graphical user interface, the graphical user interface at least partially comprising a game scene, and at least part of a virtual object, wherein the method comprises:

detecting a plurality of sounds in a first preset range of the game scene, and acquiring a type of each sound, and an orientation of a sound source of each of the sounds relative to the virtual object;

providing a plurality of visual controls on the graphical user interface, the number of the visual controls being the same as the sounds, wherein the plurality of visual controls are provided in one-to-one correspondence with the plurality of sounds, and each of the visual controls comprises a virtual component associated with the type of a respective one of the sounds; and controlling a pointing direction of each of the virtual components according to the orientation of the sound source of a respective one of the sounds relative to the virtual object, wherein the first preset range is a range determined according to an auditory range of the virtual object, an entire area of the game scene, or an area of the game scene currently displayed on the graphical user interface.

10. The visual method for compensating sound information according to claim 9, wherein the method further comprises:

acquiring a distance between a sound source of a respective one of the sounds and the virtual object; and controlling a display form of each of the virtual components according to the distance between the sound source of a respective one of the sounds and the virtual object.

11. A non-transitory computer readable storage medium storing a computer program thereon, wherein the computer program is executed by a processor to implement the visual method for compensating sound information according to claim 1.

12. A non-transitory computer readable storage medium storing a computer program thereon, wherein the computer program is executed by a processor to implement the visual method for compensating sound information according to claim 6.

13. A non-transitory computer readable storage medium storing a computer program thereon, wherein the computer program is executed by a processor to implement the visual method for compensating sound information according to claim 9.

14. An electronic device, comprising:
a processor; and
a memory for storing executable instructions of the processor;
wherein the processor is configured to execute the visual method for compensating sound information according to claim 1 via executing the executable instructions.

15. The electronic device according to claim 14, wherein the processor is further configured to:
acquire a distance between the sound source of the sound and the virtual object; and
control a display form of the virtual component according to the distance between the sound source of the sound and the virtual object.

16. The electronic device according to claim 14, wherein the processor is further configured to: before the step of providing the visual control on the graphical user interface,
determine the sound source of the sound is located within a second preset range and out of a third preset range.

17. The electronic device according to claim 14, wherein the virtual component comprises an ideographic image and a direction identifier, the ideographic image is corresponding to the type of the sound, and a pointing direction of the direction identifier is corresponding to the orientation of the sound source of the sound relative to the virtual object.

18. The electronic device according to claim 14, wherein the processor is further configured to:
control a display form of at least one of a transparency, a size or a brightness of the virtual component according to the distance between the sound source of the sound and the virtual object.

19. An electronic device, comprising:
a processor; and
a memory for storing executable instructions of the processor;
wherein, the processor is configured to execute the visual method for compensating sound information according to claim 6 via executing the executable instructions.

20. The electronic device according to claim 19, wherein the virtual component comprises an ideographic image and a plurality of directional identifiers, the number of the directional identifiers is the same as the sounds, the ideographic image is the corresponding to the type of the first sound, and the plurality of direction identifiers are provided in one-to-one correspondence with the plurality of sounds; and
the processor is further configured to:
controlling a pointing direction of each of the direction identifiers according to the orientation of the sound source of a respective one of the sounds relative to the virtual object.

21. The electronic device according to claim 19, wherein the processor is further configured to:
acquire a distance between the sound source of the first sound and the virtual object; and
control a display form of the virtual component according to the distance between the sound source of the first sound and the virtual object.

22. An electronic device, comprising:
a processor; and
a memory for storing executable instructions of the processor;
wherein, the processor is configured to execute the visual method for compensating sound information according to claim 9 via executing the executable instructions.

23. The electronic device according to claim 22, wherein the processor is further configured to:
acquire a distance between a sound source of a respective one of the sounds and the virtual object; and
control a display form of each of the virtual components according to the distance between the sound source of a respective one of the sounds and the virtual object.

* * * * *